Feb. 19, 1963  J. A. McLAUGHLIN  3,077,718
MOWING MACHINE
Filed Aug. 17, 1961  3 Sheets-Sheet 1
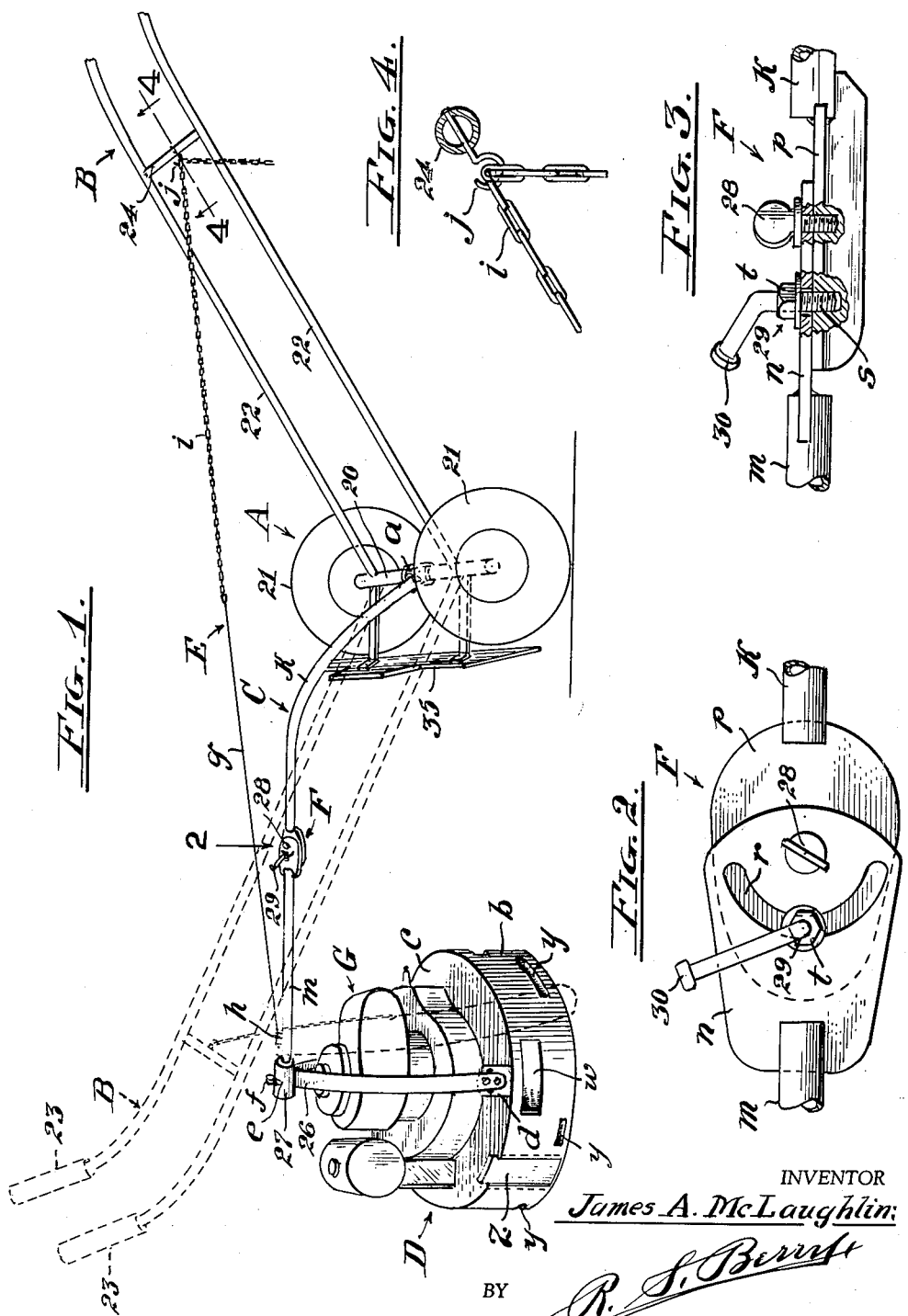
INVENTOR
James A. McLaughlin
BY R. S. Berry
ATTORNEY

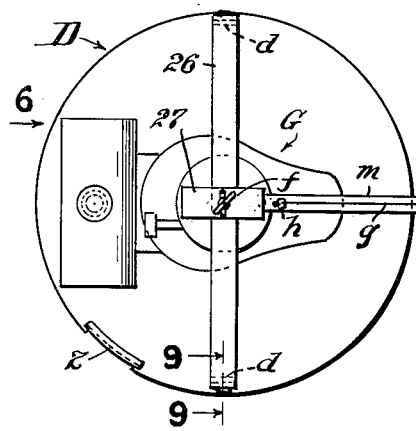
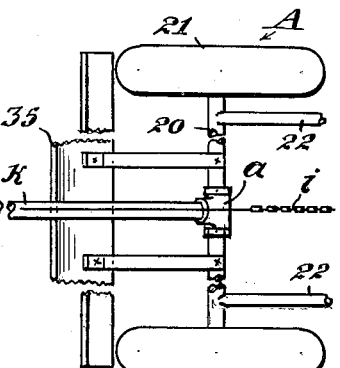
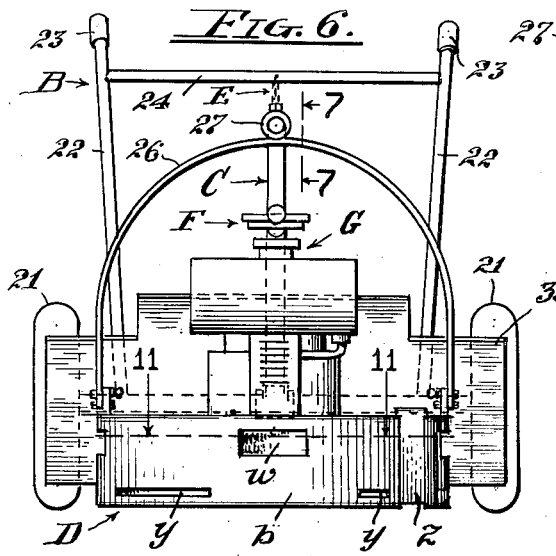
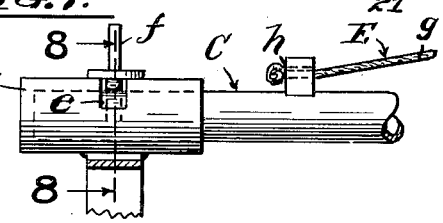
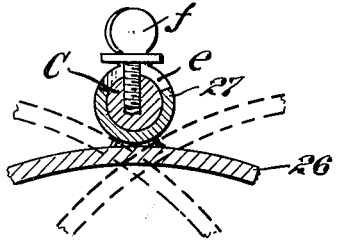
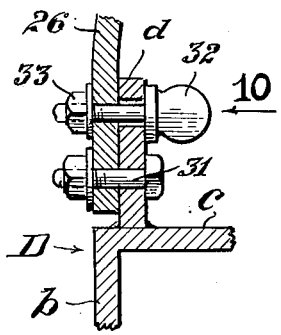
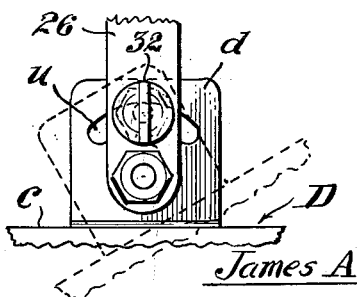

Feb. 19, 1963 J. A. McLAUGHLIN 3,077,718
MOWING MACHINE
Filed Aug. 17, 1961 3 Sheets-Sheet 3
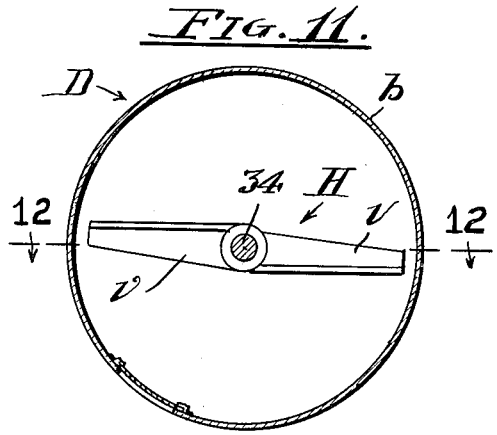
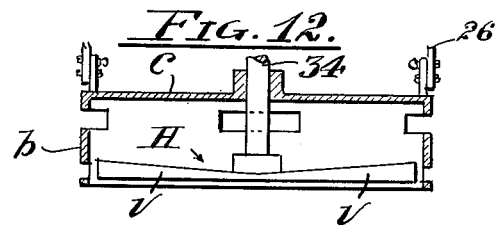
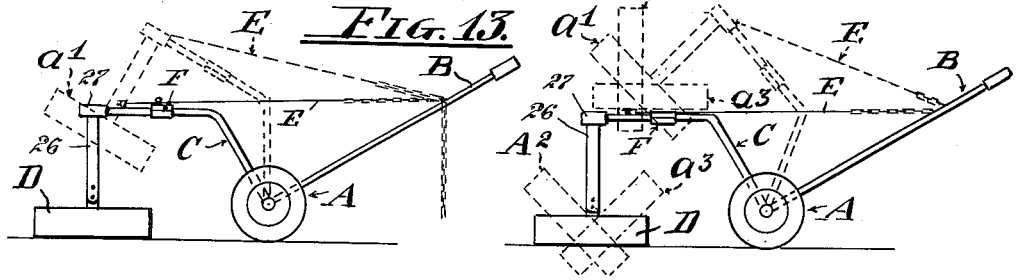
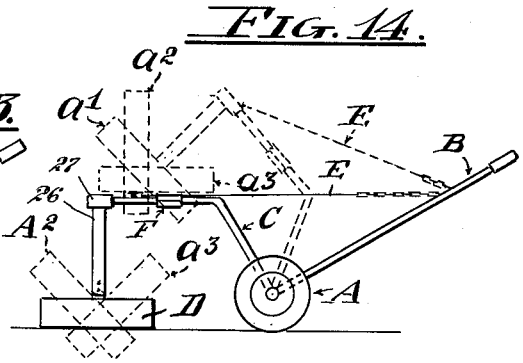
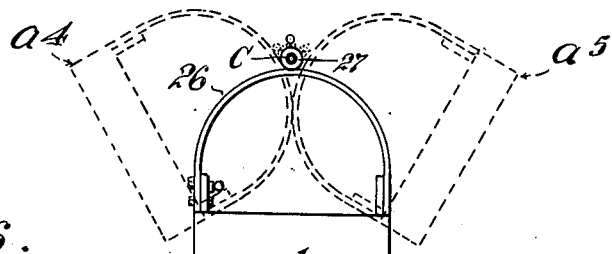
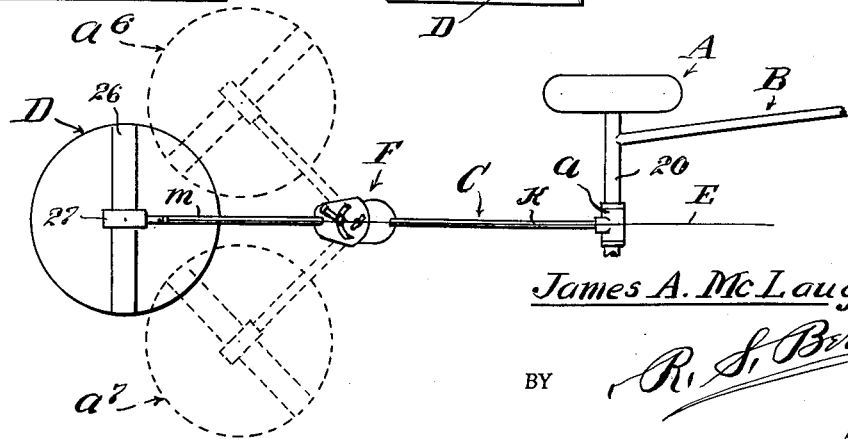
INVENTOR
James A. McLaughlin
BY R. S. Berry
ATTORNEY

United States Patent Office 3,077,718
Patented Feb. 19, 1963

3,077,718
MOWING MACHINE
James A. McLaughlin, 333 Roosevelt St.,
Chula Vista, Calif.
Filed Aug. 17, 1961, Ser. No. 132,228
3 Claims. (Cl. 56—25.4)

This invention relates to a mowing machine of the type embodying a power driven mowing mechanism carried on a manually steerable wheeled carriage.

The primary object of the invention is to provide a mowing machine of the above character which, while adapted for use in mowing lawn surfaces in general; is especially applicable for use in cutting grass, weeds and similar vegetation, growing on steep aclivities and declivities, such as the banks of mounds and the walls of basins, ditches and various other surfaces ordinarily not subject to being mowed by the conventional lawn mowers, at least not without the exercise of considerable effort in manipulating the mower.

A particular object of the invention is to provide a power actuated mowing mechanism and a mounting therefor including a wheeled carriage, wherein a head embodying the mowing mechanism may be disposed at various lateral, forward and rearward inclinations relative to the carriage remote therefrom, and wherein the mowing mechanism may also be swung laterally relative to the carriage and disposed in various positions on either side thereof while in either its normal position or in any of its tilted positions.

Another object is to provide a construction whereby the mowing mechanism may be manually raised or lowered and disposed at various elevations relative to the carriage while in any of its tilted positions or in its laterally swung positions.

A further object is to provide a mowing machine wherein the mowing mechanism is supported on a tiltable beam projecting from a wheeled carriage fitted with a steering lever, with means interconnecting the beam and the lever for disposing the beam and lever in various opposed longitudinally extending angular positions relative to each other, and wherein the lever is mounted to be folded in overlying relation to the beam when the machine is not in use, so as to render it compact for storage and shipping purposes.

With the foregoing objects in view together with such other objects and advantages as may subsequently appear, the invention is carried into effect as hereinafter described and claimed, and as set forth by way of example in the accompanying drawings, in which:

FIG. 1 is a perspective view of the mowing machine as seen from above and to one side thereof showing it in its normal position in full lines and indicating the steering lever in its folded position in dotted lines, FIG. 2 is an enlarged detail in plan of the portion of the machine indicated by the arrow 2 in FIG. 1 showing a pivotal joint whereby the mowing mechanism may be swung laterally to various positions relative to a carriage on which the mowing mechanism is carried, FIG. 3 is a view in side elevation of the structure shown in FIG. 2 with portions broken away and showing parts in section;

FIG. 4 is an enlarged detail in section and elevation as seen on the line 4—4 of FIG. 1 in the direction indicated by the arrows;

FIG. 5 is a plan view of the mowing machine with the outer end portion of the lever removed;

FIG. 6 is an end elevation of the mowing machine in the direction indicated by the arrow 6 in FIG. 5;

FIG. 7 is a detail in section and elevation as seen on the line 7—7 of FIG. 6;

FIG. 8 is a diagram in cross section taken on the line 8—8 of FIG. 7, depicting in dotted lines alternate adjusted position of the parts;

FIG. 9 is an enlarged detail in section taken on the line 9—9 of FIG. 5;

FIG. 10 is a view in elevation on the structure shown in FIG. 9 as seen in the direction indicated by the arrow 10 and indicated in dotted lines an alternate adjusted position of the parts;

FIG. 11 is a view in horizontal section of the mower housing as seen on the line 11—11 of FIG. 6 showing in plan the cutting blade of the mower;

FIG. 12 is a detail in section and elevation as seen on the line 12—12 of FIG. 11;

FIGS. 13 and 14 are schematic diagrams of the mowing machine with the power plant removed as seen in side elevation showing the housing of the mowing mechanism in its various vertically tilted positions in dotted lines;

FIG. 15 is a diagram of the mower housing showing it as tilted laterally in dotted lines in either direction by the mounting thereof shown in FIG. 8; and FIG. 16 is a diagram in plan of a fragmentary portion of the machine with the power plant removed depicting in dotted lines the mode of swinging the mowing mechanism laterally in either direction relative to the wheeled carriage.

Referring to the drawings more specifically A indicates generally a wheeled carriage comprising a single axle 20 revolubly supported at its ends on a pair of complementary traction wheels 21—21. A lever B, here shown as comprising a pair of spaced parallel handle bars 22—22, is affixed to the axle 20. The lever bars are fitted at their outer ends with hand grips 23—23 through which the carriage A may be trundled and steered. A cross bar 24 extends transversely between the bars 22—22 and is affixed at its ends to the outer portions of the latter.

Pivotally mounted for vertical swinging movement relative to the carriage A and projecting upwardly and forwardly opposite the direction of the extension of the lever B is a beam C here shown as having its inner end affixed to a sleeve $a$ turnably mounted on the axle 20 intermediate the ends thereof. A mower D is suspended from the outer end of the beam C, which mower embodies a housing including a cylindrical side wall $b$ and top wall $c$. The housing is suspended by a bail 26 the ends of which are connected to diametrically opposed upstanding flanges $d$ projecting from marginal portions of the top wall $c$, which bail is affixed intermediate its ends to a sleeve 27 turnably mounted on the outer end of the beam C as particularly shown in FIG. 7. The sleeve 27 has a circumferentially extending slot $e$ through which the threaded shank of a thumb screw $f$ is screwed into engagement with the beam C for clamping the sleeve 27 in various adjusted positions circumferentially of the beam.

When the parts above described are normally disposed, the wheeled carriage A and the housing will rest upon a supporting surface with the beam C projecting forwardly of the carriage and the lever B projecting rearwardly thereof. When thus disposed, the top wall $c$ of the housing will extend parallel with the supporting surface. The lever B being fixed on the axle 20 will normally be disposed with its outer end resting on the supporting surface because of the axle 20 being turnable relative to the wheels 21, but when the machine is not in use, or stored, the lever may be swung forwardly to overlie the beam C as indicated in dotted lines in FIG. 1. However, a feature of the invention resides in the provision of a connection E between the outer end portions of the beam C and lever B whereby the lever and beam may be disposed in various angular relations to each other. This connection is here shown as comprising a length of wire cable g connected at one end to the outer end portion of the beam C, as indicated at h in FIG. 7, the other end of the cable being connected to one end of a chain i, a selected link of which chain is engaged with a hook j fixed on the cross bar 24.

The mower D normally gravitates to its lowermost position on the pivotal connection of the beam C with the axle 20, and acts through the connection E to dispose the lever B in an elevated upwardly inclined position according to and varied by the length of the connection between the outer end of the beam C and the cross bar 24. The connection E may be lengthened or shortened as occasion may require by engaging links of the chain i with the hook j at various points along the length of the chain.

The beam C is divided intermediate its ends thereby providing the beam with inner and outer end portions k and m which portions are interconnected by a pivotal coupling F embodying a pair of overlying and slidably abutting upper and lower plates n and p interconnected by a pivot pin 28 for lateral or horizontal swinging movement relative to each other whereby the outer end portion m of the beam C carrying the mower D may be swung laterally to dispose the mower to either side of the longitudinal center of the machine defined by the inner end portion k of the beam C. The upper plate n has an arcuate slot r concentric with the axis of the pivot 28 and extending through the slot r is a clamping bolt 29 having a threaded stem s screwed into engagement with the lower plate p and having a head t thereon arranged to engage the upper plate n. The bolt 29 has a handle 30 whereby it may be readily manually turned to place it in or out of clamping engagement with the upper plate n; the plates n and p being designed to be clamped together to hold the outer end portion m of the beam C in a desired adjusted position.

As shown in FIG. 9 the ends of the bail 26 are connected to the flanges d by a pivot 31 in the form of a bolt and nut, whereby the mower D may be swung around the pivots to various inclined positions on the bail 26. As a means of fastening the mower relative to the bail the flanges d are each formed with an arcuate slot u as shown in FIG. 10, through which is extended the threaded shank of a thumb screw 32 which shank passes through the adjacent end portion of the bail 26 and is engaged by a nut 33; the thumb screw 32 being screwed into the nut 33 to tightly clamp the bail 26 against the flanges d to hold the mower in its adjusted position on the bail.

The mover D embodies a conventional power plant G mounted on the top wall c of the housing which power plant is adapted to drive a vertically extending rotary shaft 34 in a usual manner. The shaft 34 extends downwardly into the housing and is fitted at its lower end with a mower blade H as particularly shown in FIGS. 11 and 12. The blade H is here shown as comprising a pair of corresponding aligned horizontally extending blades v—v having oppositely presented cutting edges lying on a plane slightly above that of the lower margin of side wall b of the mower housing.

Air inlet openings w—w are provided in the wall b at intervals around the circumference thereof adjacent the top wall c and a series of discharge slots y are provided in the wall b adjacent the lower margin of the latter and extending on a plane leading through the ends of the cutter blades v—v.

A vertically slidable panel z is provided in the side wall b adapted to be elevated to afford access to the interior of the housing from the side thereof.

Mounted on the carriage A and extending upright forwardly of the wheels 21—21 and adjacent thereto is a panel 35 constituting a shield for protecting the operator from flying cuttings or debris cast by the mower toward the carriage.

In the operation of the invention, where the machine is to be employed in mowing a wide expanse of a flat or nearly flat surface, such as a lawn of level or approximately level surface area, the parts of the machine are arranged as shown in FIG. 1 or substantially so, with the lower margin of the housing seating on the supporting surface and with the lever B extending rearwardly at an upward inclination to position the grips 23 on the handles forming the lever B in a position to be conveniently held and manipulated by an operator and so that on depressing the lever, the beam C will be rocked upwardly by a pull imparted to the beam through the connection E from the lever B so that the machine may then be readily wheeled about.

The mowing mechanism H embodied in the head D is set in motion by activating the power plant G in the usual manner; the powered shaft 34 being driven to rotate the blades v—v which act to mow grass, weeds and the like overlaid by the head D.

In effecting the mowing operation, the machine is manipulated by the lever B so as to move the head D and position it over the vegetation to be mowed which in some instances is accomplished by wheeling the carriage A with the lever B depressed sufficiently to elevate the head high enough above the surface being mowed to cause the lower margin of the side wall b to depress and pass over vegetation as the mower head advances; the depressed vegetation on being freed of the advancing margin of the wall b usually springing upward into the path of the mower blades v—v. However, in some instances, particularly where the vegetation is high, or not subject to being depressed by advance of the mower head thereover, the lever B is operated to elevate the head above the vegetation to be mowed whereupon the mower head is lowered to encompass the vegetation by elevating the lever B to thereby place the vegetation in the path of the revolving mower blades.

Where the vegetation to be mowed is on a steep aclivity rising from a level plane, the lever B is disposed in an elevated position by shortening the connection E whereby on depressing the lever B the beam may be elevated to dispose the mower head D in a desired upwardly inclined position as indicated in dotted lines $a^1$ in FIGS. 13 and 14.

Where it is desired to dispose the mower head D in a tilted position in the direction of the length of the beam C in either direction as indicated by the dotted lines $a^2$ and $a^3$ in FIG. 14, the mower head is adjusted to a selected tilted position on the bail 26 on loosening the pivots 31 and thumb screws 32 and then swinging the mower head on the pivots 31. When disposed in the desired position the mower head is clamped on the bail against movement thereon by tightening the pivots 31 and thumb nuts 32 in a usual manner. The mower head may thus be disposed in any desired inclined position longitudinally of the beam C within the limits of the length of the slots u in the flanges d, and may be disposed in such position irrespective of the positions of the bail 26 and beam C.

Where it is desired to tilt the mower head D laterally, the sleeve 27 is loosened on the outer end of the beam C and turned laterally thereon in either direction within the limits of the slot e and when disposed in the desired direction, the thumb screw f being first loosened is then tightened in the beam C to clamp the sleeve 27 thereon. The mower head may thus be laterally inclined as shown by the dotted lines $a^4$ and $a^5$ in FIG. 15, irrespective of the position of the bail 26 and beam C relative to each other.

When it is desired to swing the mower head D laterally to either side of the beam C, the thumb nuts 28 and 29 are loosened in the coupling F, the outer end portion m of the beam C is swung on the shank of the thumb screw 28 to the desired lateral position within the limits of the slot r in the plate n, whereupon the screw 28 is tightened and the nut 29 is tightened as by the finger lever 30, to clamp the parts n—p of the coupling F in their desired relative position. In this manner the mower head D may be adjusted laterally to a fixed position in either direction relative to the beam C and carriage A as indicated by the dotted lines $a^6$ and $a^7$ in FIG. 16, irrespective of various positions of the beam C relative to the carriage, and also irrespective of the various adjusted positions of the mower head on the bail 26 longitudinally of the beam and the various pivotal positions of the mower head around the beam C.

While I have shown specific features of the invention, such are subject to variation and accordingly the invention contemplates such changes and alterations in the recited structure as come within the meaning and scope of the appended claims.

I claim:

1. In a mowing machine, the combination of a wheeled axle, a beam pivotally connected at one end thereof to said axle for vertical swinging movement relative thereto, a bail pivotally connected to the outer end of said beam in dependent relation thereto for swinging movement laterally of said beam, clamping means on said beam for holding said bail stationary thereon, a mower head pivotally carried on said bail, a clamp connecting said bail and mower head for holding the latter against movement relative to said bail, powered mowing mechanism mounted on said head, a manually operable steering lever affixed at one end thereof to said axle and normally extending longitudinally therefrom in a direction leading away from said beam, an elongated connection between the outer end portions of said beam and lever whereby said lever will be normally disposed in an upwardly inclined relation to said beam under the action of the weight of said beam and mower head and whereby downward movement of said lever will elevate said beam and mower head relative to the surface on which said wheeled axle is supported, said beam being divided intermediate its ends, a pivotal coupling between the divided end portions of said beam on which said mower head may be swung laterally, and a clamp embodied in said pivotal coupling for releasably holding the divided portions of said beam against movement relative to each other.

2. The combination called for in claim 1 in which the connections between the ends of said bail and said mower head comprise flanges fixed on said mower head, pivots connecting the ends of said bail to said flanges on which said head may be turned to various inclined positions on said bail, and means for clamping said bail and flanges together to hold said head against movement in any of its positions around said pivots.

3. The combination called for in claim 1 in which the pivotal connections between said bail and said beam comprises a sleeve on said beam to which said bail is rigidly affixed, said sleeve being turnable laterally on said beam to dispose said bail and head in various positions around said beam, and means for clamping said sleeve against movement on said beam to hold said bail against movement relative to said beam.

References Cited in the file of this patent

UNITED STATES PATENTS

| | | |
|---|---|---|
| 2,662,561 | Duncan | Dec. 15, 1953 |
| 2,676,448 | Limberger | Apr. 27, 1954 |
| 2,730,320 | Srader | Jan. 10, 1956 |
| 2,909,021 | McLane | Oct. 20, 1959 |
| 3,032,956 | Mullet | May 8, 1962 |